US012447642B1

(12) United States Patent
Tsukimoto et al.

(10) Patent No.: US 12,447,642 B1
(45) Date of Patent: Oct. 21, 2025

(54) KNIFE CASE

(71) Applicant: KAI R&D CENTER CO., LTD., Seki (JP)

(72) Inventors: Hironobu Tsukimoto, Seki (JP); Kohei Hyuga, Seki (JP); Shogo Ochiai, Seki (JP)

(73) Assignee: KAI R&D CENTER CO., LTD., Seki (JP)

( * ) Notice: Subject to any disclaimer, the term of this patent is extended or adjusted under 35 U.S.C. 154(b) by 0 days.

(21) Appl. No.: 18/873,608

(22) PCT Filed: Jul. 7, 2022

(86) PCT No.: PCT/JP2022/026981
§ 371 (c)(1),
(2) Date: Jun. 12, 2025

(87) PCT Pub. No.: WO2024/009460
PCT Pub. Date: Jan. 11, 2024

(30) Foreign Application Priority Data

Jul. 7, 2022 (JP) ................................ 2022-109811

(51) Int. Cl.
*B26B 29/02* (2006.01)

(52) U.S. Cl.
CPC .................................. *B26B 29/02* (2013.01)

(58) Field of Classification Search
CPC ......... B26B 29/02; B26B 29/00; B26B 29/04; B26B 29/025; B25H 3/00; B25H 3/006; B25H 3/02; B25H 3/06
(Continued)

(56) References Cited

U.S. PATENT DOCUMENTS 216,605 A * 6/1879 Crosby .................. B26B 29/00 224/241
2,792,108 A * 5/1957 Keller ................. B24D 15/085 30/538
(Continued)

FOREIGN PATENT DOCUMENTS

EP 0383487 A1 * 8/1990 ......... A61B 17/3217
GB 2460914 A 12/2009
(Continued)

OTHER PUBLICATIONS

Office Action; "Decision to Grant," issued in JP 2022-109811; mailed by the Japanese Patent Office on Jul. 19, 2022.
(Continued)

*Primary Examiner* — Rafael A Ortiz
(74) *Attorney, Agent, or Firm* — Studebaker Brackett PLLC

(57) ABSTRACT

A knife case including a first case and a second case is configured to make a knife with a blade and a handle lockable in a closed state using a slide lock member while housing the blade in housing space formed in the closed state and exposing the handle from the housing space. The closed state is a state where a first case and a second case face each other that are coupled to each other via a hinge. The knife case is configured to be locked at a plurality of positions including both ends of the slide lock member in a longitudinal direction thereof simultaneously so as to prevent release of the second case from the first case by moving the slide lock member from an opening position to a closing position to cover the guide part and the locked parts with the slide lock member.

5 Claims, 13 Drawing Sheets

(58) Field of Classification Search
USPC ......... 206/349, 208, 228, 351, 352, 15.3, 71
See application file for complete search history.

(56) References Cited

U.S. PATENT DOCUMENTS

| | | | | | |
|---|---|---|---|---|---|
| 5,148,916 | A * | 9/1992 | Tillyer, Sr. | A45C 13/02 | 206/472 |
| 5,662,220 | A * | 9/1997 | Schurman | B25H 3/006 | 206/349 |
| 5,662,221 | A * | 9/1997 | Abidin | A61B 17/3215 | 206/352 |
| 5,669,516 | A * | 9/1997 | Horn | B25H 3/06 | 211/DIG. 1 |
| 6,874,629 | B1 * | 4/2005 | Wortrich | A61B 17/3217 | 206/349 |
| 7,434,684 | B1 * | 10/2008 | Mabra | F42B 39/007 | 220/4.23 |
| 2002/0189965 | A1 * | 12/2002 | Welsh, Jr. | B26B 29/025 | 206/349 |
| 2015/0321335 | A1 * | 11/2015 | Lai | B65D 43/164 | 206/349 |
| 2016/0059430 | A1 * | 3/2016 | Justin Coffey | B26B 29/025 | 206/349 |

FOREIGN PATENT DOCUMENTS

| | | | |
|---|---|---|---|
| JP | S57-094468 | U1 | 6/1982 |
| JP | 2002-346246 | A | 12/2002 |
| JP | 2003-311049 | A | 11/2003 |
| JP | 3216383 | U | 5/2018 |

OTHER PUBLICATIONS

International Search Report issued in PCT/JP2022/026981; mailed Aug. 9, 2022.

* cited by examiner

KNIFE CASE

TECHNICAL FIELD

One aspect of the present invention relates to a knife case.

BACKGROUND ART

There is a knife case for enclosing a knife represented by a kitchen knife and storing the knife when not in use. Such a knife case is disclosed in Patent Documents 1 and 2, for example. A sheath for knife shown in patent Document 1 has a configuration where two sheath forming pieces are separable, and a rubber magnet 5 is adhesively attached to one sheath forming piece 3. A blade protection tool (knife blade protector) shown in Patent Document 2 has a configuration where the blade protection tool is composed of two plate-like members connected to each other via a hinge, each plate-like member has a magnetic body formed on one face, and each magnetic body is magnetized with a plurality of longitudinal poles that alternate in polarity in a width direction of the magnetic body. In this configuration, while the magnetic bodies are brought into close proximity to each other by folding the hinge, a north pole of one magnetic body and a south pole on the other magnetic body are in alignment in such a manner as to face each other.

CITATION LIST

Patent Documents

Patent Document 1: Japanese Utility Model Application Publication No. Sho 57-94468

Patent Document 2: United Kingdom Patent Application Publication No. 2460914

SUMMARY

Technical Problem

However, the conventional knife case needs to be improved in terms of safely storing a knife that requires great care in handling. For example, in some cases, the conventional knife case has encountered a situation where the knife case is easily opened and the knife is exposed when the knife case unexpectedly drops while holding the knife.

Furthermore, in response to a desire to achieve maximum compactness in taking out a knife such as a kitchen knife for use outdoors, a need arises for a knife case capable of generating a state where only a blade is covered and a handle is exposed from the case. Such a knife case is assumed to be carried while housed in a bag or a box together with a different item. In some cases, external force acts on the knife case when the knife case collides with the different item or is pressed with the different item. In such cases, the case may unintentionally be opened, or the knife may unintentionally come out of the case. In the case of a conventional sheath-type cover to be used with a knife inserted therein, for example, the knife comes out of the cover easily so effort should be made for preventing coming out of the knife.

In some cases, the conventional knife case has further caused a situation where a knife rattles in the case and generates sound during carrying to cause a sense of discomfort or interrupt a conversation, for example.

Solution to Problem

To solve the problems described above, the present invention provides the following means.

A knife case according to one aspect of the present invention is configured to make a knife with a blade and a handle lockable in a closed state using a slide lock member while housing the blade in housing space formed in the closed state and exposing the handle from the housing space. The closed state is a state where a first case and a second case face each other that are coupled to each other via a hinge.

The first case includes: a first surface part; a first wall part formed in such a manner as to project from an edge of the first surface part in a direction perpendicular to the first surface part; a magnet provided at the first surface part to face the second case in the closed state; a blade passage part formed in a short-side direction of the first case opposite to the hinge, and configured to allow a connection of the blade with the handle to pass therethrough in the closed state; a heel support part provided closer to the hinge than the blade passage part and formed of a ridge projecting from an edge of the first surface part or from the vicinity of the edge in a direction perpendicular to the first surface part so as to prevent a heel of the knife from coming off the housing space in the closed state; a guide part provided at an edge portion opposite to the hinge in such a manner as to extend in a longitudinal direction of the first case, and guiding movement of the slide lock member; and the slide lock member attached to the guide part, and configured to be slidable along the guide part between a closing position defined in the closed state and an opening position defined in an opened state and to cover the guide part and locked parts when the slide lock member is at the closing position.

The second case includes: a second surface part to face the first surface part in the closed state; the locked parts provided at an edge portion opposite to the hinge and are provided at a plurality of positions including both ends of the slide lock member in a longitudinal direction thereof in the closed state; and a ridge provided at a position to face the heel support part in the closed state and projecting from the second surface part in a perpendicular direction.

By moving the slide lock member from the opening position to the closing position, the knife case is locked at the plurality of positions including the both ends of the slide lock member in the longitudinal direction thereof simultaneously so as to prevent release of the second case from the first case.

As the above-described knife case has a compact configuration where only the blade is housed while the handle is exposed from the housing space, the knife case achieves excellent portability and can be taken out easily for use outdoors, etc. Meanwhile, even with the compact configuration, the knife case is configured as an openable/closable case using the slide lock member. By the provision of a wall using the heel support part to be responsive to a heel portion of the knife, even if external force is applied to the knife case during carrying as a result of collision with another item in a bag, for example, it is still possible to prevent opening of a knife case or unintentional coming off of the knife from the knife case, thereby achieving safety. Furthermore, by placing the magnet in the case for causing the knife to stick thereto and stabilizing the knife, it becomes possible to reduce the occurrence of rattling of the knife inside the knife case during carrying. Thus, the occurrence of sound can be reduced.

As a result of the configuration with the magnet, in housing the blade, the knife can stick to an inner surface of the opened knife case and can be held stably when the knife is placed on the inner surface. Thus, in trying to house the knife with the knife case held in hand, it is possible to close or lock the knife case while preventing the blade from getting out of position. Specifically, the knife case is designed by taking safety further into consideration for a user in trying to house the knife.

In the above-described knife case, it is possible to lock the knife case in the closed state at the plurality of positions simultaneously including the both ends of the slide lock member in the longitudinal direction thereof only by making sliding movement of the slide lock member from the opening position to the closing position. Specifically, it is possible to safely maintain a state of housing the knife only by sliding the slide lock member. In this closed state, even if the knife case unexpectedly drops, it is still possible to prevent the knife case from being opened easily. This achieves a safer configuration than the conventional knife case.

In the configuration of the above-described knife case, most of the constituting elements are concentrated on the first case side. Thus, this configuration is easy to assemble during manufacture.

The knife case is practically formed into a flat-plate shape. Meanwhile, depending on temperature change, external force to be applied during carrying, or the own weight of the knife, for example, the case may be warped or distorted entirely. Even in such a case, as a result of the configuration of the knife case including the plurality of locked parts provided at the both ends and to be locked by the slide lock member, it is possible to prevent partial opening of the knife case, etc., making it possible to maintain the closed state reliably.

From the viewpoint of "reducing inequalities among people and countries," which is the 10th goal of the 17 goals of the SDGs, the above-described knife case is configured to be operable by everyone independently of age, sex, the presence or absence of disability, etc. This makes it possible to create an environment allowing everyone to equally participate in handling of knives. Furthermore, from the viewpoint of "responsible production and consumption," which is the 12th goal of the 17 goals of the SDGs, the above-described knife case is configured to house only a blade portion compactly, thereby achieving reduction in waste generation. Specifically, with the above-described knife case, it is possible to provide a product toward a sustainable world.

As the blade passage part is provided opposite to the hinge, a cutting edge is pointed toward the hinge when housed. This makes it unlikely that the cutting edge will touch a finger when the knife case is opened, thereby achieving a safer configuration.

Preferably, in the configuration of the above-described knife case, the slide lock member includes a slide regulating step part that regulates sliding of the slide lock member from the closing position to the opening position.

The knife case with this configuration is configured to regulate sliding of the slide lock member from the closing position to the opening position. Thus, it is possible to maintain the closed state easily, thereby achieving a safer configuration.

Preferably, in the configuration of the above-described knife case, the hinge is formed by being separated into three or more in the longitudinal direction of the first case and a longitudinal direction of the second case.

As described above, the knife case according to one aspect of the present invention is configured in such a manner that the cutting edge of the knife to be housed therein is pointed toward the hinge. This might cause contact of the cutting edge with the hinge during housing or taking out of the knife. In this case, the hinge might be damaged partially. In this regard, in the configuration of the above-described knife case, the hinge is separated into three or more in the longitudinal direction. Thus, if one of the portions is damaged, the other two portions are left in effect, thereby preventing a situation where the hinge is damaged immediately in its entirety. In this way, it is possible to configure a knife case having durability and safety.

Preferably, in the configuration of the above-described knife case, the slide lock member has a surface provided with asperities.

As the above-described knife case has excellent portability, it is also suitable for use outdoors. In using a knife outdoors, conditions are not prepared well in many cases compared to an indoor kitchen and it may be necessary to conduct various types of work with a wet hand. In order to be handled safely even when used in such a situation, the configuration of the above-described knife case is provided with the asperities acting as a slip resistance on the surface of the slide lock member. Thus, even if the knife case is used outdoors, a configuration taking safety into consideration and making the knife case safely available is still achieved. As a result of being capable of easily preventing sliding down, the knife case is certainly given a safer configuration also in the case of use in an indoor kitchen.

Preferably, in the configuration of the above-described knife case, the slide lock member is formed into a U-shape in a section in such a manner as to cover an end face of the first case opposite to the hinge, and has a through hole formed in such a manner as to face the end face of the first case, and the first case has an open/close identification mark that is changed in a way in which the mark is visually recognized through the through hole between the opened state and the closed state.

In the knife case of this configuration, when the knife case is viewed even from the end face side, it is still possible to easily determine by visual check whether the knife case is in the opened state or in the closed state. This allows for a configuration with improved safety.

DESCRIPTION OF EMBODIMENTS

Figure 1:
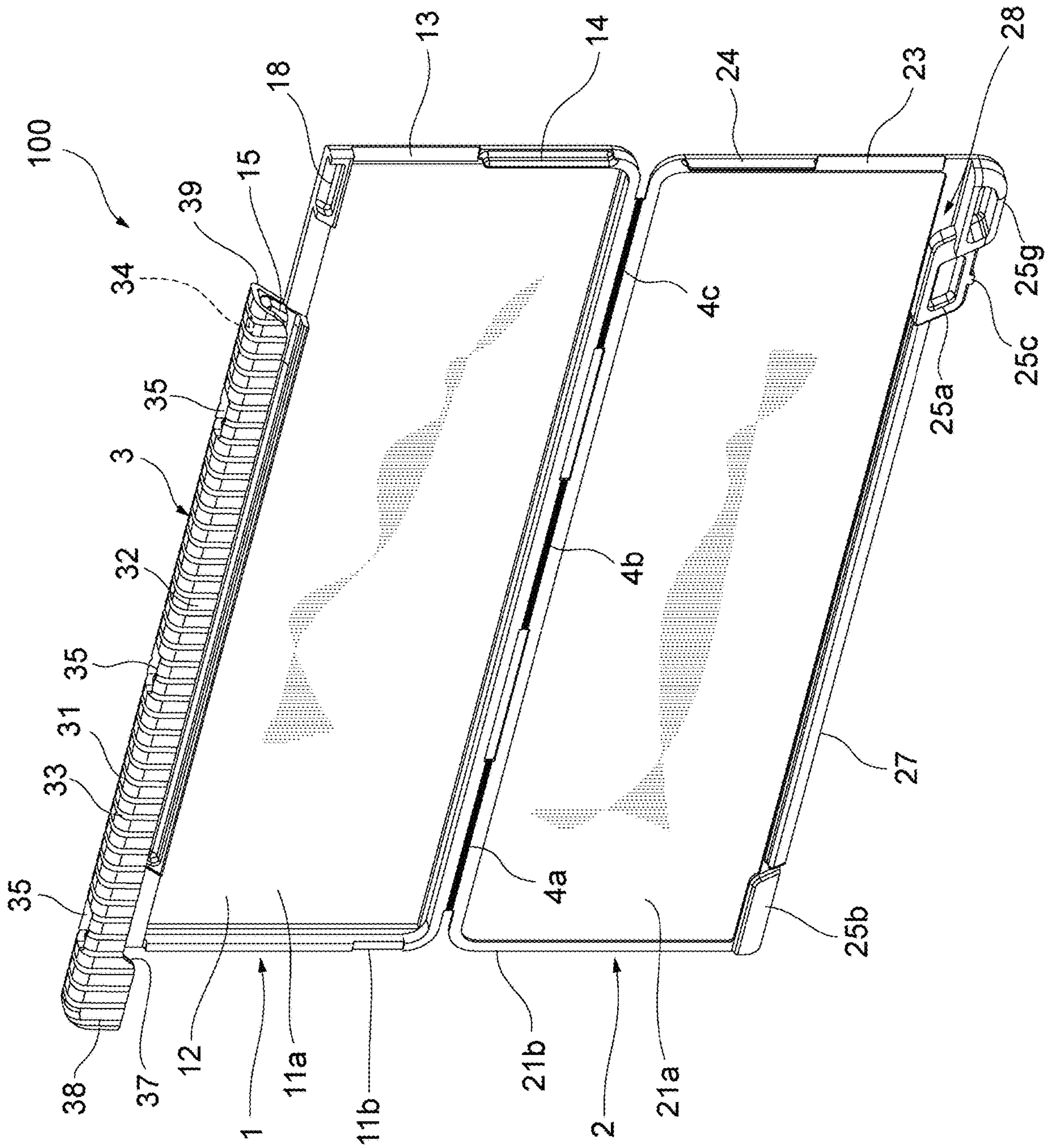
FIG. 1 is a perspective view of a knife case in an unfolded state.
Figure 2:
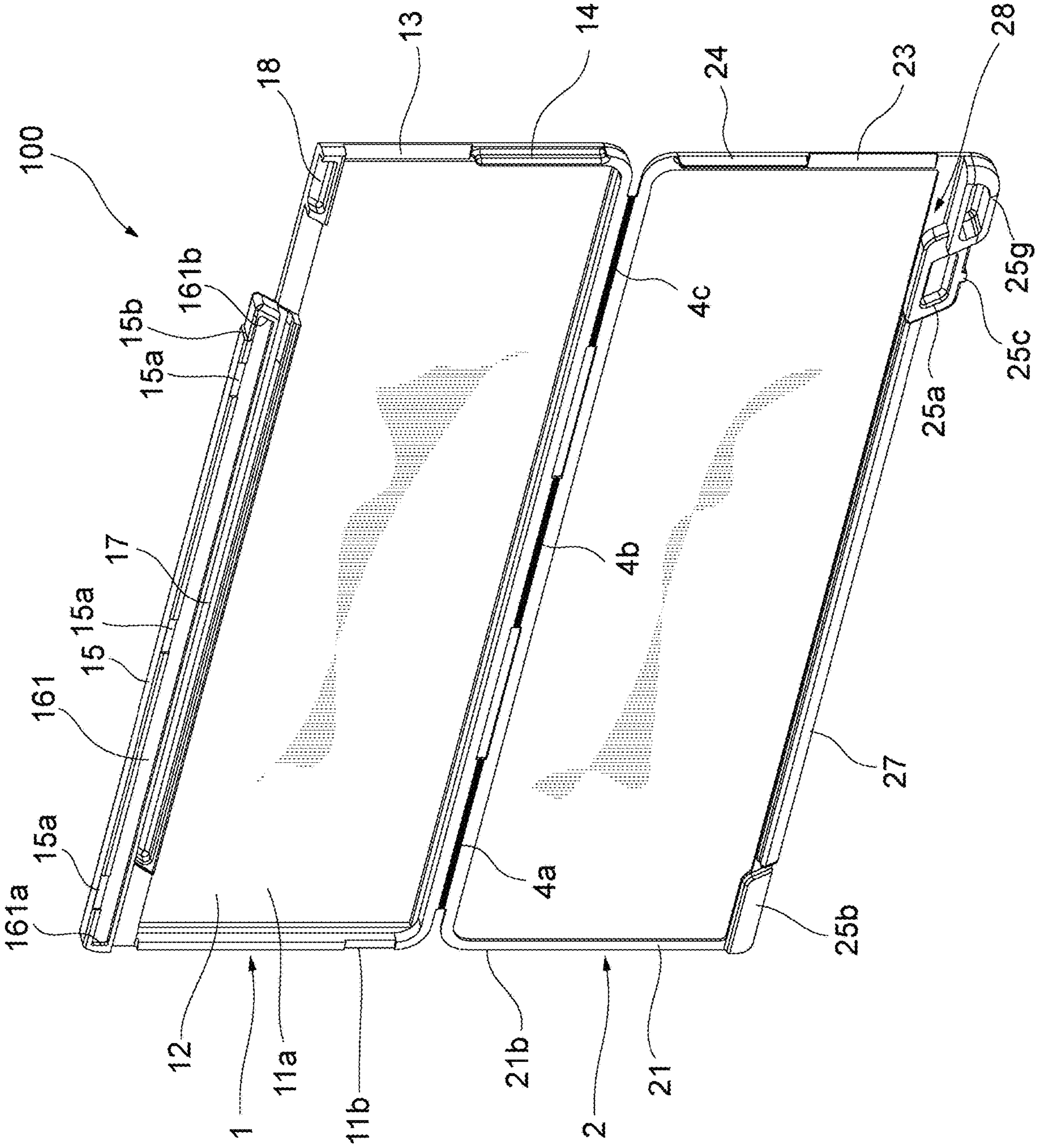
FIG. 2 is a perspective view of the knife case in the unfolded state while a slide lock member is detached.
Figure 3:
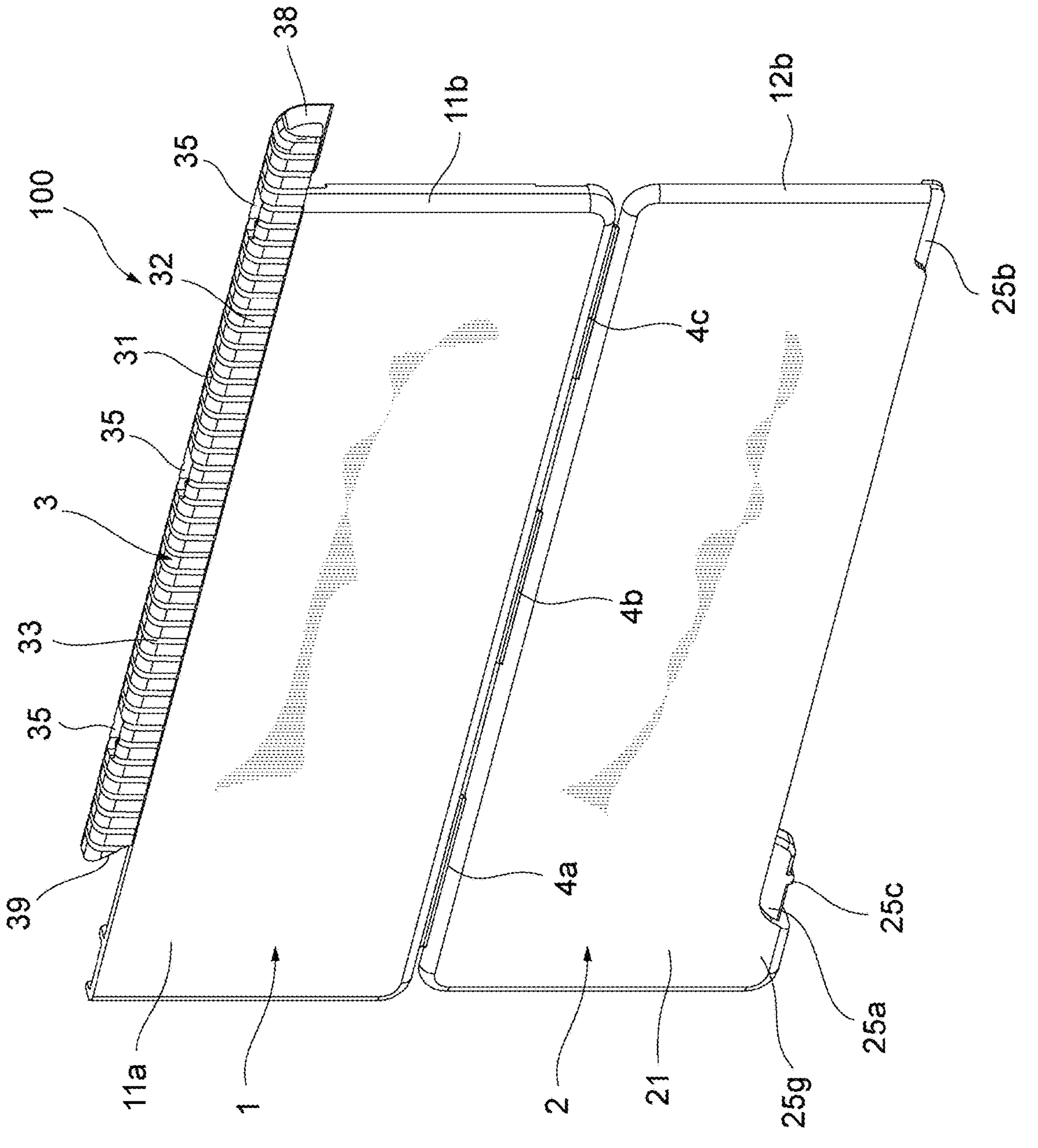
FIG. 3 is a perspective view of the knife case in the unfolded state.
Figure 4:
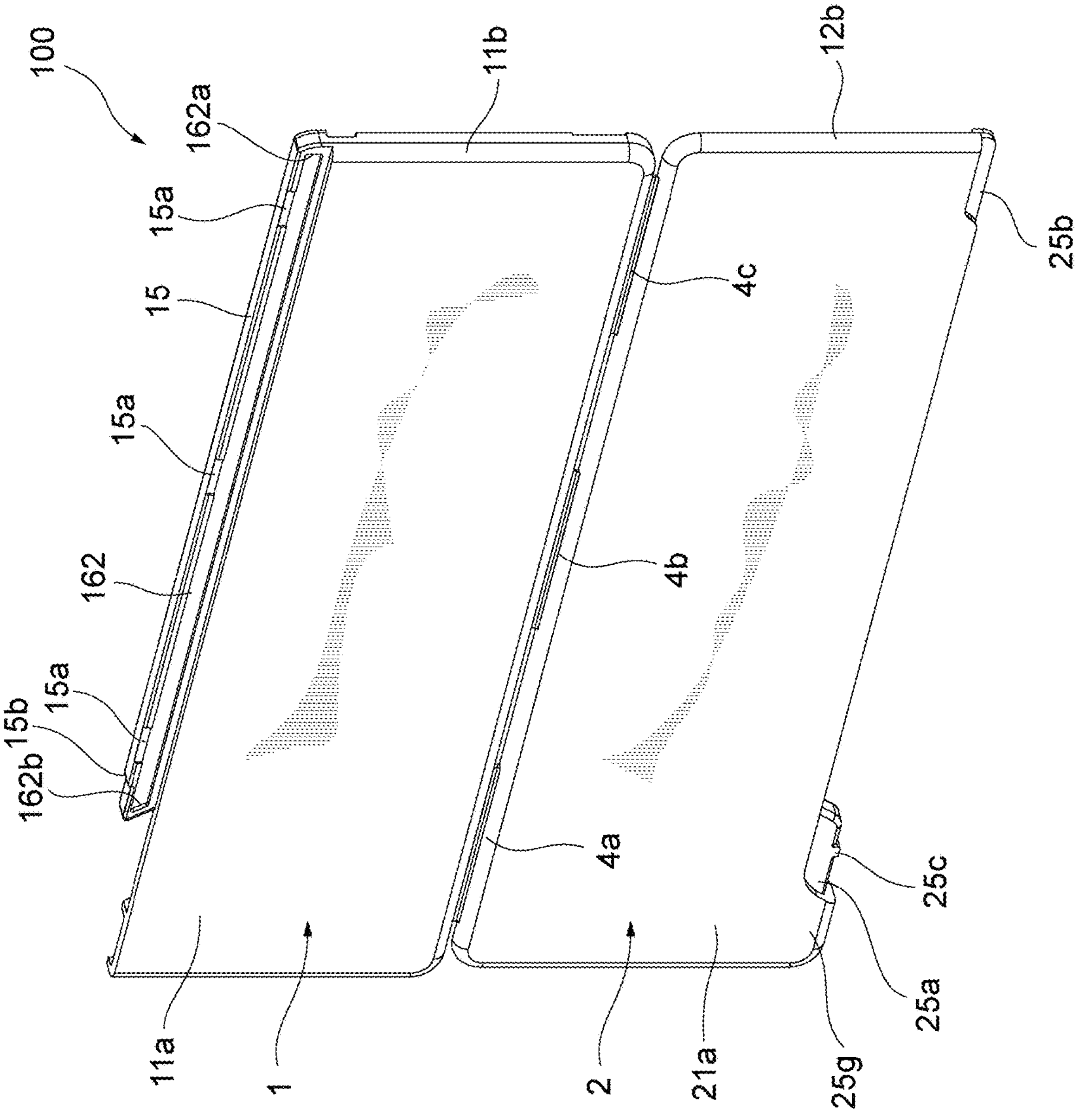
FIG. 4 is a perspective view of the knife case in the unfolded state while the slide lock member is detached.

A knife case according to one embodiment of the present invention is characterized in that the knife case has a configuration where most of the constituting elements are concentrated on a first case side, the configuration can safely maintain a state of housing a knife only through sliding operation, and others.

A present embodiment will be described below by referring to the accompanying drawings. To facilitate understanding of the description, constituting elements in the drawings same as or corresponding to each other are given the same sign to the extent possible, and description overlapping between such elements is omitted.

[Knife case 100]

Figure 5:
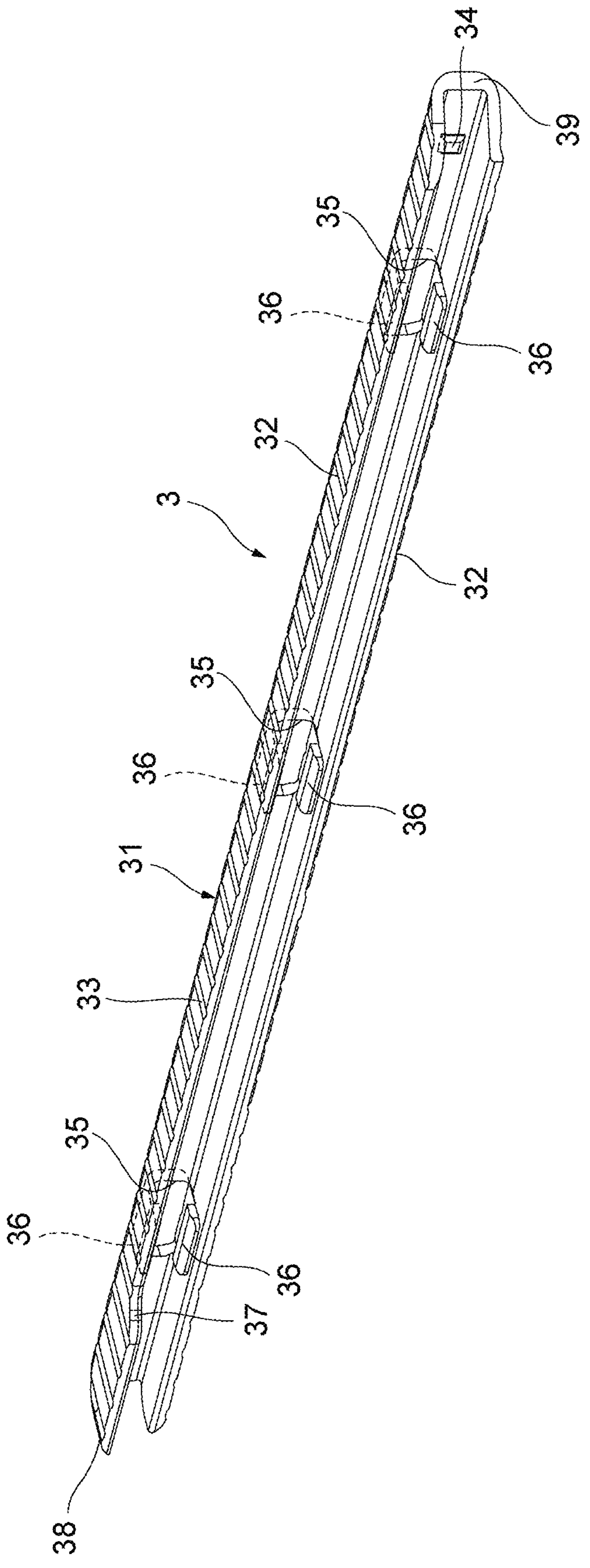
FIG. 5 is a perspective view of the slide lock member.
Figure 6:
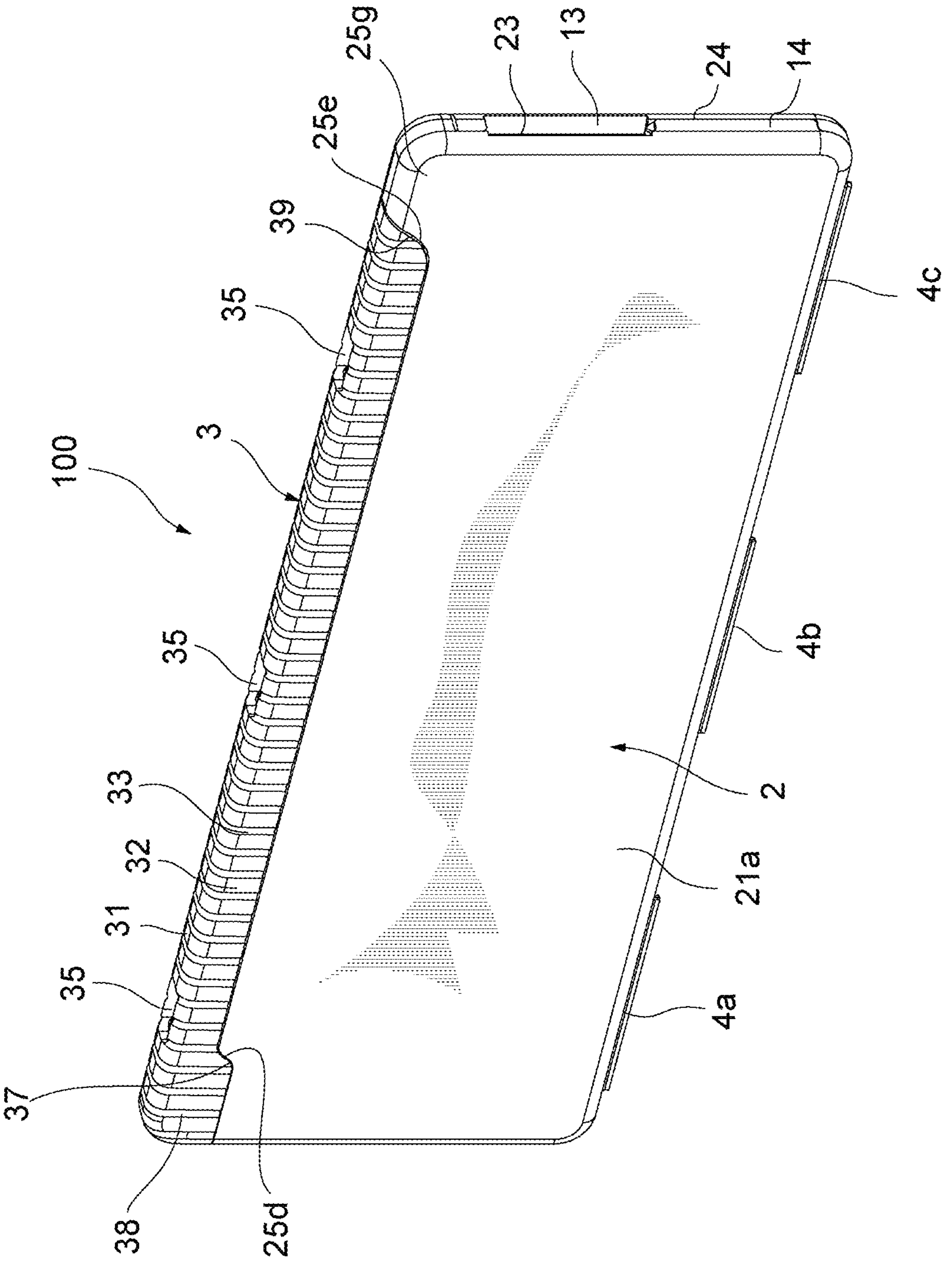
FIG. 6 is a perspective view of the knife case in a closed state.
Figure 7:
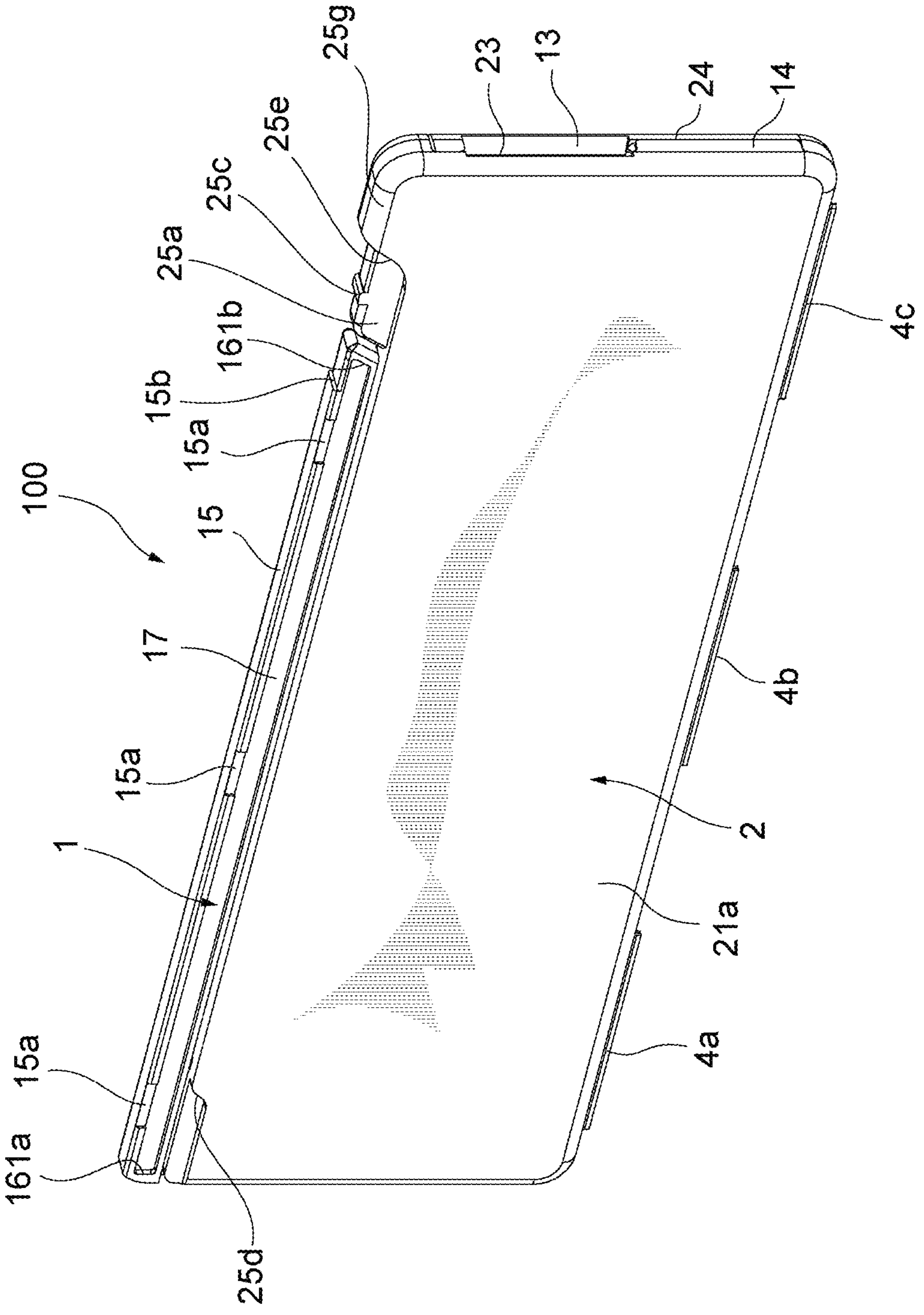
FIG. 7 is a perspective view of the knife case in the closed state while the slide lock member is detached.
Figure 8:
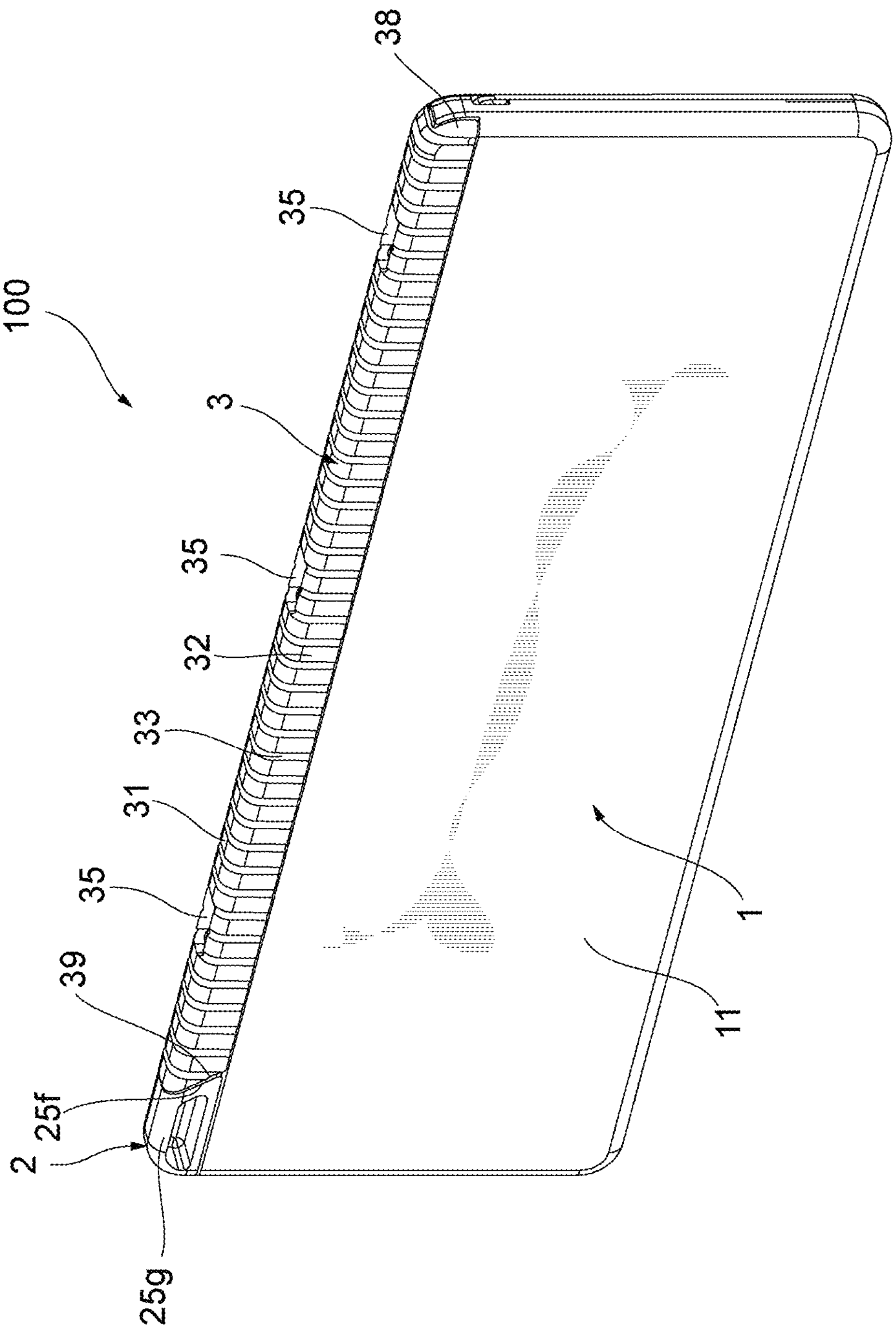
FIG. 8 is a perspective view of the knife case in the closed state.
Figure 9:
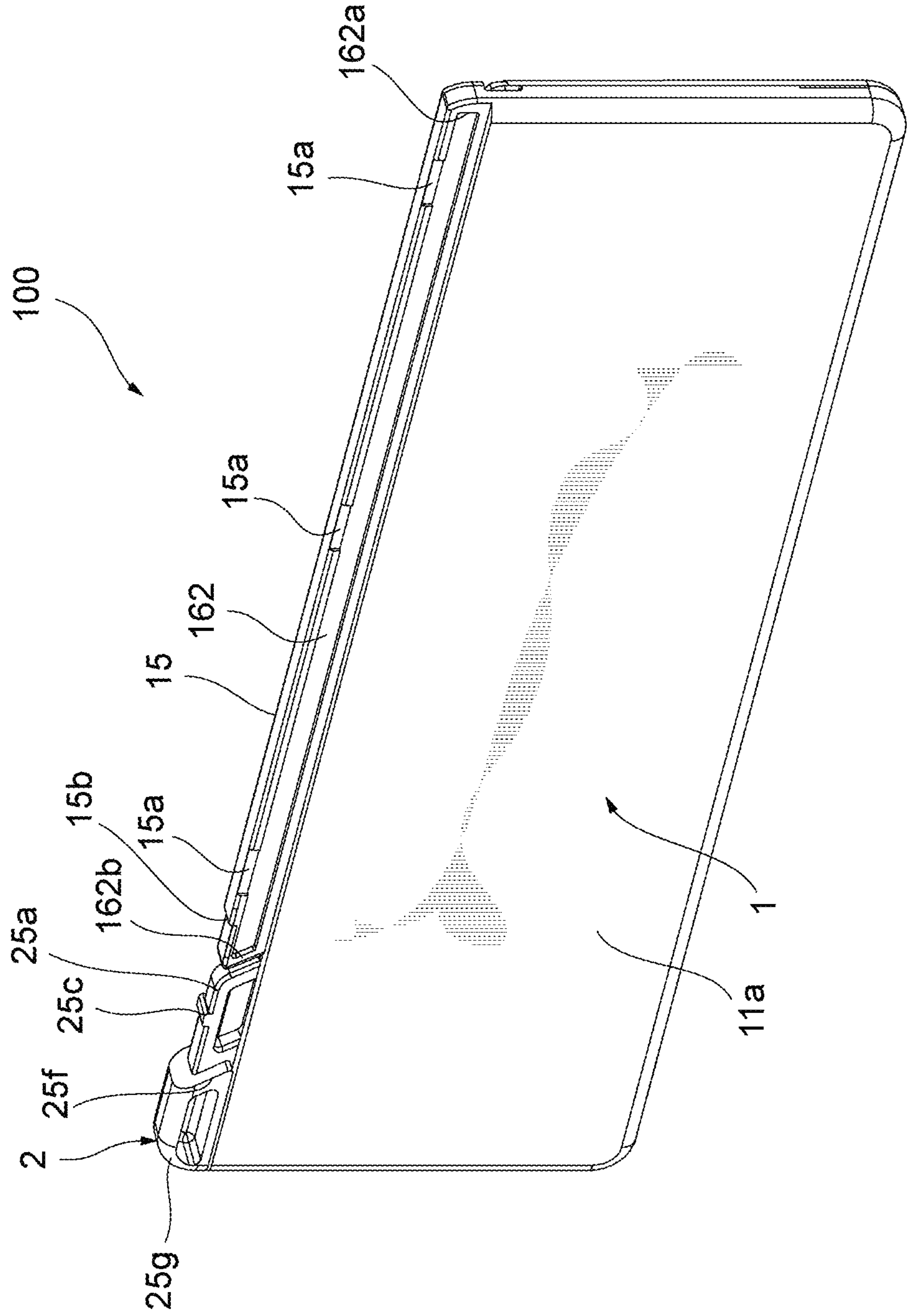
FIG. 9 is a perspective view of the knife case in the closed state while the slide lock member is detached.

FIGS. 1 to 9 are views showing the configuration of a knife case 100 according to an embodiment. FIGS. 1 to 4 are perspective views of the knife case 100 in an unfolded state. FIG. 5 is a perspective view of a slide lock member 3. FIGS. 6 to 9 are perspective views of the knife case 100 in a closed state. FIGS. 2, 4, 7, and 9 show a state where the slide lock member 3 is detached.

As shown in these drawings, the knife case 100 of the present embodiment is composed of a first case 1, a second case 2, the slide lock member 3, and hinges 4*a* to 4*c*. The first case 1 and the second case 2 are coupled to each other via the hinges 4*a* to 4*c*. While all the first case 1, the second case 2, the slide lock member 3, and the hinges 4*a* to 4*c* are typically made of resin, they are not limited to this. Specifically, at least some of the first case 1, the second case 2, the slide lock member 3, and the hinges 4*a* to 4*c* may be made of metal, for example, other than resin. The slide lock member 3 is attached to the first case 1, as will be described later in detail.

In the closed state where the first case 1 and the second case 2 face each other and the slide lock member 3 is at a closing position, the first case 1 and the second case 2 form housing space and the housing space allows a blade of a knife as a housing target to be housed therein. In this state, a handle of the knife is exposed to the outside of the housing space. Making sliding movement of the slide lock member 3 from an opening position to the closing position with the first case 1 and the second case 2 facing each other allows the knife case 100 to be locked in the closed state.

A state where the first case 1 and the second case 2 face each other is called a facing state. A state where the slide lock member 3 is at the closing position in the facing state is called the closed state. Meanwhile, a state unfolded in such a manner as to bring the first case 1 and the second case 2 into a planar state such as that shown in FIGS. 1 to 4 is called an opened state.

[First Case 1]

The first case 1 has a configuration including a first surface part 11*a*, a first wall part 11*b*, a magnet 12, a blade passage part 13, a heel support part 14, a guide part 15, a guide groove 161, a fitting groove 17, and a fitting projection part 18.

The first surface part 11*a* is a plate-like member formed in such a manner as to face a second surface part 21*a* of the second case 21. The first wall part 11*b* projecting in a wall shape in a perpendicular direction toward the second case 2 is formed at an edge along two sides of the four sides of the first surface part 11*a*. The first wall part 11*b* is formed into an L shape at an edge along a long side adjacent to a side where the hinges 4*a* to 4*c* are formed and at an edge along a short side opposite to a side where the blade passage part 13 and the heel support part 14 are formed.

The magnet 12 is a plate-like permanent magnet arranged on a side of the first surface part 11*a* facing the second surface part 21*a*. The magnet 12 has a size extending over the first surface part 11*a* entirely. The magnet 12 is adhesively attached to the first surface part 11*a* with an adhesive or double-sided adhesive tape, for example. However, the magnet 12 is not limited to this. As an example, the first surface part 11*a* in its entirely may be formed of a permanent magnet to further function as the magnet 12, or the magnet 12 and the first case 1 may be formed integrally by insert forming or the like.

The magnet 12 causes a blade formed of stainless steel as a ferromagnet to stick thereto. By providing the magnet 12 on the first surface part 11*a*, a blade of a knife to be housed can stably be held at least temporarily and the knife can be housed safely in the knife case 100. The magnet 12 is intended to hold the blade at least temporarily as described above, so that a material having proper magnetic force is employed. For example, the magnet 12 has magnetic force such that the blade will be movable to some extent on the magnet 12 even with the blade placed on the magnet 12 and that the blade will not drop even if the first surface part 11*a* is pointed directly downward in a vertical direction. As the magnet 12 has a size covering the first surface part 11*a* entirely, a range the size of a knife capable of being housed safely in the knife case 100 is extended.

The blade passage part 13 is formed at an edge along a short side of the first case 1 opposite to a side where the hinges 4*a* to 4*c* are provided. The first wall part 11*b* is formed at an edge along a short side of the first case 1 facing the short side where the blade passage part 13 is provided. The blade passage part 13 can be said to be a part of an outer edge of the first case 1 in the absence of wall-like elements such as the first wall part 11*b*, the heel support part 14, and the guide part 15 or the fitting groove 17.

When a knife is housed in the knife case 100, a connection between a blade and a handle of the knife is passed through the blade passage part 13. In other words, the blade passage part 13 forms a through hole at the knife case 100 together with a blade passage part 23 in the facing state to allow the connection of the knife to be passed through the through hole.

The heel support part 14 is formed of a ridge provided closer to the hinges 4*a* to 4*c* than the blade passage part 13 and projecting in a perpendicular direction from an edge of the first surface part 11*a* toward the second surface part 21*a*. A ridge 24 of the second case 2 described later is formed at a position to face the heel support part 14 in the facing state. The heel support part 14 and the blade passage part 13 are provided linearly along the short side of the first case 1. The heel support part 14 and the ridge 24 of the second case 2 are provided in such a manner as not to interfere with each other in the facing state and the closed state. The heel support part 14 is located inwardly of the ridge 24 and a heel of a knife forms direct abutting contact with the heel support part 14. The heel support part 14 may be formed in the vicinity of the edge of the first surface part 11*a* instead of being formed at the edge.

The heel support part 14 has a regulatory function of preventing a heel of a knife from coming off the housing space in the closed state by coming into close proximity to or abutting contact with the heel of a blade of the knife.

The guide part 15 is provided at an edge portion along a long side of the first case 1 opposite to the side of the locations of the hinges 4a to 4c in such a manner as to extend linearly in a longitudinal direction of the first case 1. The guide part 15 guides sliding movement of the slide lock member 3 to facilitate operation by a user. The guide part 15 has a function of preventing the slide lock member 3 from coming off the first case 1.

The guide part 15 has a predetermined width in a thickness direction that is a direction from the first case 1 toward the second case 2. The width of the guide part 15 is substantially equal to the length of the housing space in the thickness direction formed by the first case 1 and the second case 2, namely, the length thereof in a direction perpendicular to a longitudinal direction and a short-side direction of the knife case 100. Here, the thickness of the magnet 12 is not considered.

The guide part 15 has a plurality of cutouts 15a at both ends thereof in a width direction formed inwardly from an end face. Three pairs each composed of the cutouts 15a facing each other in the width direction of the guide part 15 are formed uniformly in a direction in which the guide part 15 extends. Specifically, the cutouts 15a are provided in the vicinities of both ends of the guide part 15 in the extending direction thereof and in the vicinity of a center of the guide part 15 in the extending direction. These cutouts 15a are provided in order to facilitate attachment of the slide lock member 3 with guide projections 36 described later to the first case 1. Specifically, the positions of the cutouts 15a are positions facing the guide projections 36 of the slide lock member 3.

The guide part 15 includes a third slide regulating step part 15b provided at a surface facing a bottom part 31 of the slide lock member 3. The third slide regulating step part 15b abuts on a first slide regulating step part 34 of the slide lock member 3 at the opening position to regulate further movement of the slide lock member 3 in a direction of getting away from the first case 1 (opening direction).

The guide groove 161 is provided next to the guide part 15 and is formed in such a manner as to extend in a groove shape in the longitudinal direction of the first case 1. In other words, the guide groove 161 is a part formed into a groove shape by being surrounded by a wall-like part projecting in a direction perpendicular to the first surface part 11a. While the guide groove 161 is provided on both sides of the first case 1 at the knife case 100, it may be provided only on one of the sides of the first case 1. While the slide lock member 3 is attached to the first case 1, the guide projections 36 are inserted in the guide groove 161. The guide projections 36 are movable to the extent that the guide groove 161 is formed. In other words, the guide projections 36 and the guide groove 161 are some of elements defining a range of movement of the slide lock member 3.

As shown in FIGS. 2, 4, 7, and 9, movement regulating parts 161a and 161b are formed at both ends of the guide groove 161 in an extending direction thereof, namely, at both ends in a longitudinal direction thereof. While the slide lock member 3 is attached to the first case 1, the movement regulating parts 161a and 161b regulate movement of the slide lock member 3 to define a range of movement of the slide lock member 3. The movement regulating part 161a abuts on the guide projections 36 when the slide lock member 3 is at the opening position to regulate further movement of the slide lock member 3 in the direction of getting away from the first case 1 (opening direction). The movement regulating part 161b abuts on the guide projections 36 when the slide lock member 3 is at the closing position to regulate further movement of the slide lock member 3 in a closing direction opposite to the opening direction. Specifically, the movement regulating parts 161a and 161b prevent the slide lock member 3 from coming off the first case 1.

The fitting groove 17 is provided at a position facing a fitting ridge 27 of the second case 2 in the facing state. The fitting groove 17 extends in a groove shape in a longitudinal direction thereof. In the facing state, the fitting ridge 27 fits in the fitting groove 17.

The fitting projection part 18 is provided at an edge portion along the long side of the first case 1 opposite to the side of the locations of the hinges 4a to 4c, and is provided on an extension of the fitting groove 17. The fitting projection part 18 is provided at a position next to the blade passage part 13. The fitting projection part 18 is inserted in a recess part 28 of the second case 2 in the facing state.

[Second Case 2]

The second case 2 has a configuration including the second surface part 21a, a second wall part 21b, the blade passage part 23, the ridge 24, locked parts 25a and 25b, a second slide regulating step part 25c, movement regulating parts 25d, 25e, and 25f, the fitting ridge 27, and the recess part 28.

The second surface part 21a is a plate-like member formed in such a manner as to face the first surface part 11a. The second wall part 21b projecting in a wall shape in a perpendicular direction toward the first case 1 is formed at edges along two sides of the four sides of the second surface part 21a. The second wall part 21b is formed into an L shape at an edge along a long side adjacent to a side where the hinges 4a to 4c are formed and at an edge along a short side opposite to a side where the blade passage part 23 and the ridge 24 are formed.

The blade passage part 23 is formed at an edge along a short side of the second case 2 opposite to the side where the hinges 4a to 4c are provided. The second wall part 21b is formed at an edge along a short side of the second case 2 facing the short side where the blade passage part 23 is provided. The blade passage part 23 can be said to be a part of an outer edge of the second case 2 in the absence of wall-like elements such as the second wall part 21b, the ridge 24, and the fitting ridge 27. When a knife is housed in the knife case 100, a connection between a blade and a handle of the knife is passed through the blade passage part 23.

The ridge 24 is formed closer to the hinges 4a to 4c than the blade passage part 23 and projects in a perpendicular direction from the second surface part 21a toward the first surface part 11a. The heel support part 14 of the first case 1 is formed at the position to face the ridge 24 in the facing state. The ridge 24 is located outwardly of the heel support part 14 and does not abut on a heel of a knife directly. The ridge 24 may be configured to support the heel by abutting on the heel. However, like in the present embodiment, it is preferable that the first case 1 having structures including the magnet 12 has the function of supporting the heel.

The fitting ridge 27 is provided at a position to face the fitting groove 17 of the first case 1 in the facing state. The fitting ridge 27 is a ridge extending in a longitudinal direction thereof, and projects in a perpendicular direction from the second surface part 21a toward the first surface part 11a. In the facing state, the fitting ridge 27 fits in the fitting groove 17.

The recess part 28 is provided at an edge portion along a long side of the second case 2 opposite to the side of the locations of the hinges 4a to 4c, and is provided on an extension of the fitting ridge 27. The recess part 28 is provided at a position next to the blade passage part 23. The recess part 28 are becomes fitted with the fitting projection part 18 of the first case 1 in the facing state.

The locked parts 25*a* and 25*b* are provided at an edge portion along the long side of the second case 2 opposite to the side of the locations of the hinges 4*a* to 4*c*, and are provided on an extension of the fitting ridge 27. The locked part 25*a* is provided at a position next to the recess part 28. The locked part 25*b* is provided opposite to the recess part 28. Specifically, the locked parts 25*a* and 25*b* are provided at positions to correspond to both ends of the slide lock member 3 in a longitudinal direction thereof in the closed state. The locked parts 25*a* and 25*b* are covered together with the guide part 15 of the first case 1 by the slide lock member 3 in the closed state. By doing so, the locked parts 25*a* and 25*b* are locked so as to prevent release of the second case 2 from the first case 1.

The second slide regulating step part 25*c* is a projection formed in such a manner as to project from an end face of the locked part 25*a*. The second slide regulating step part 25*c* is provided at a position to face the bottom part 31 in the closed state that is a surface of the slide lock member 3 facing an end face of the first case 1. In the closed state, the first slide regulating step part 34 of the slide lock member 3 adjoins the second slide regulating step part 25*c*. The second slide regulating step part 25*c* comes into contact with the first slide regulating step part 34 when the slide lock member 3 moves from the closing position to the opening position or from the opening position to the closing position. At this time, the slide lock member 3 makes sliding movement in such a manner as to cause the first slide regulating step part 34 to get over the second slide regulating step part 25*c*. In doing this, a user is required to apply a given force or more for getting over the second slide regulating step part 25*c*. Specifically, the second slide regulating step part 25*c* has a function of regulating sliding movement of the slide lock member 3 from the closing position to the opening position and from the opening position to the closing position.

As shown in FIGS. 6 to 9, the second case 2 includes the movement regulating parts 25*d*, 25*e*, and 25*f*. The movement regulating part 25*d* is a part formed into a groove shape at the second surface part 21*a* and on a side opposite to a side facing the first surface part 11*a*. The movement regulating parts 25*e* and 25*f* are provided at positions facing each other, and are located at an end face of a corner part 25*g* provided at a corner of the second case 2. These movement regulating parts 25*d*, 25*e*, and 25*f* abut on the slide lock member 3 in the closing position to regulate sliding movement of the slide lock member 3.

[Slide Lock Member 3]

As shown in the perspective view of FIG. 5, the slide lock member 3 has a shape having a U-shaped section and extending in a rod form. For the convenience of description, a part of the slide lock member 3 at the bottom of the U-shaped section is called the bottom part 31, and a part extending from both ends of the bottom part 31 to be parallel to the first surface part 11*a* is called a wall part 32. As described above, the slide lock member 3 is attached to the first case 1. More specifically, the slide lock member 3 is attached in such a manner as to cover the guide part 15 of the first case 1 to hold the guide part 15 between the bottom part 31 and six guide projections 36.

The slide lock member 3 is slidably movable along the guide part 15 of the first case 1, and movement of the slide lock member 3 is regulated by the movement regulating parts 161*a* and 161*b* of the first case 1, the third slide regulating step part 15*b* of the first case 1, the movement regulating parts 25*d*, 25*e*, and 25*f* of the second case 2 (see FIGS. 6 to 9), and the second slide regulating step part 25*c* of the second case 2. The second slide regulating step part 25*c* is a part to be gotten over by the first slide regulating step part 34 when a given force or more is applied to sliding movement of the slide lock member 3, and does not act to prohibit movement of the slide lock member 3. On the other hand, the movement regulating parts 161*a* and 161*b*, the third slide regulating step part 15*b*, and the movement regulating parts 25*d*, 25*e*, and 25*f* of the second case 2 except the second slide regulating step part 25*c* act to prohibit movement of the slide lock member 3.

When the slide lock member 3 is at the opening position, the movement thereof in the opening direction is regulated by the movement regulating part 161*a* and the third slide regulating step part 15*b*. When the slide lock member 3 is at the opening position, the movement regulating part 161*a* abuts on the guide projections 36 and the third slide regulating step part 15*b* abuts on the first slide regulating step part 34.

When the slide lock member 3 is at the closing position, the movement thereof in the closing direction is regulated by the movement regulating parts 161*b*, 25*d*, 25*e*, and 25*f*. When the slide lock member 3 is at the closing position, the movement regulating part 161*b* abuts on the guide projections 36, the movement regulating part 25*d* abuts on a movement regulating part 37, and the movement regulating parts 25*e* and 25*f* abut on an end face 39. At this time, the movement regulating parts 25*e* and 25*f* abut on the end face 39 on different sides (see FIGS. 6 and 8).

Not all the elements described above for regulating movement of the slide lock member 3 are essential elements. In one configuration, only some of the elements capable of attaining the purpose of regulating movement of the slide lock member 3 may be provided. In another case, an element different from the elements of the present embodiment described above may be used to attain the purpose of regulating movement of the slide lock member 3.

The slide lock member 3 has a surface provided with surface asperities 33. The surface asperities 33 are provided over the slide lock member 3 entirely in such a manner as to extend in a direction perpendicular to the longitudinal direction of the slide lock member 3, for example. The surface asperities 33 act as a slip resistance when a user makes sliding movement of the slide lock member 3. The surface asperities 33 are not always limited to the shape of the present embodiment but may have a different shape with which the slide lock member 3 acts as a slip resistance for a finger of a user.

An end face 38 and the end face 39 are provided at both ends of the slide lock member 3 in the longitudinal direction thereof. The end face 39 abuts on the movement regulating parts 25*e* of the second case 2 when the slide lock member 3 is at the closing position, as described above. The end face 38 has a shape with an opened center and does not act to regulate movement of the slide lock member 3. Meanwhile, the end face 38 may be configured in such a manner that the end face 38 is not opened and has a function of regulating movement of the slide lock member 3.

Three through holes 35 are formed at the bottom part 31 of the slide lock member 3. The wall part 32 in the vicinities of the through holes 35 is provided with three pairs each composed of the guide projections 36 facing each other. As described above, the guide part 15 is held between the bottom part 31 and the guide projections 36.

[Hinges 4*a* to 4*c*]

The hinges 4*a* to 4*c* couple the first case 1 and the second case 2 to each other. The hinges 4*a* to 4*c* are three hinges separated from each other in the longitudinal directions of the first case 1 and the second case 2. Specifically, the hinges 4*a* to 4*c* are arranged at predetermined intervals therebetween.

[Housing of Knife]

The following describes the state of each element during housing of a knife 5 into the knife case 100 of the present invention by referring to FIGS. 10 to 13.

Figure 10:
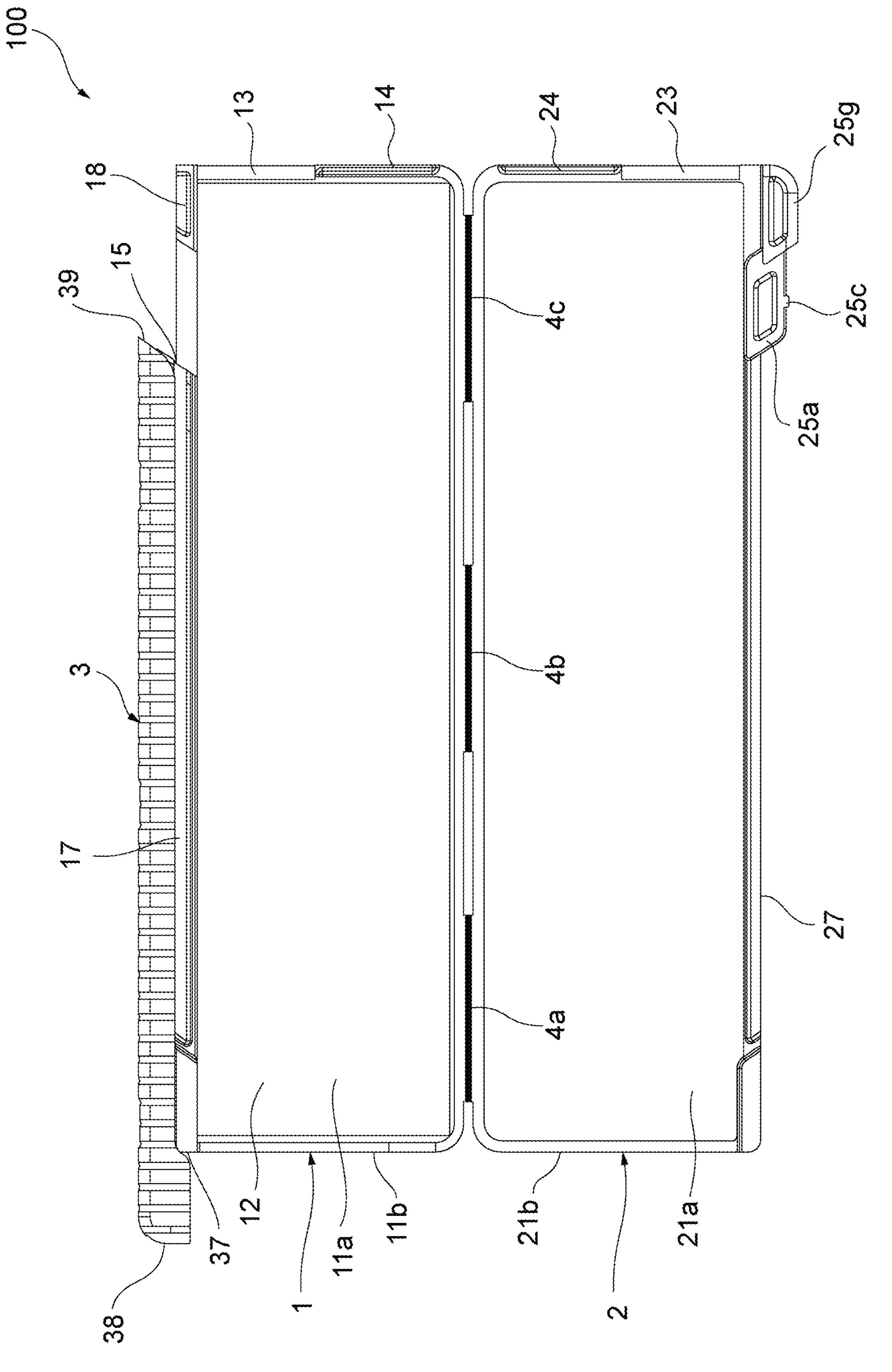
FIG. 10 is a plan view of the knife case in an opened state before housing of a knife.

FIG. 10 is a plan view of the knife case 100 in the opened state for housing the knife 5. As shown in the drawing, the knife case 100 is unfolded in such a manner as to bring the first case 1 and the second case 2 into a planar state, and the slide lock member 3 is at the opening position.

Figure 11:
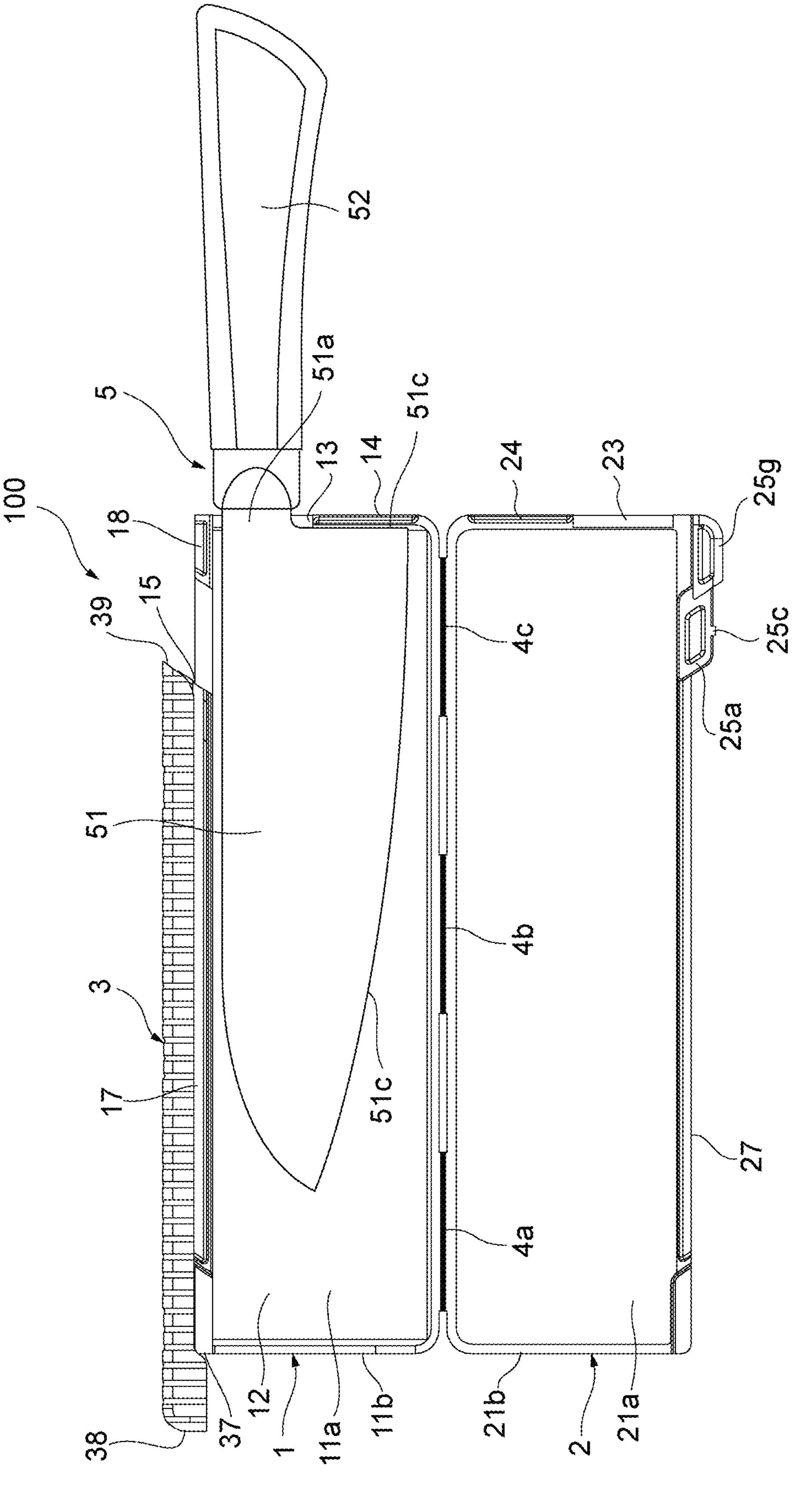
FIG. 11 is a plan view of the knife case in the opened state with the knife placed on the knife case.

Next, in this state, a user trying to house the knife 5 places a blade 51 of the knife 5 on the magnet 12 of the first case 1. At this time, a connection part 51*a* of the blade 51 with a handle 52 is located on the blade passage part 13 of the first case 1. FIG. 11 is a plan view of the knife case 100 in a state where the blade 51 is placed on the magnet 12.

Figure 12:
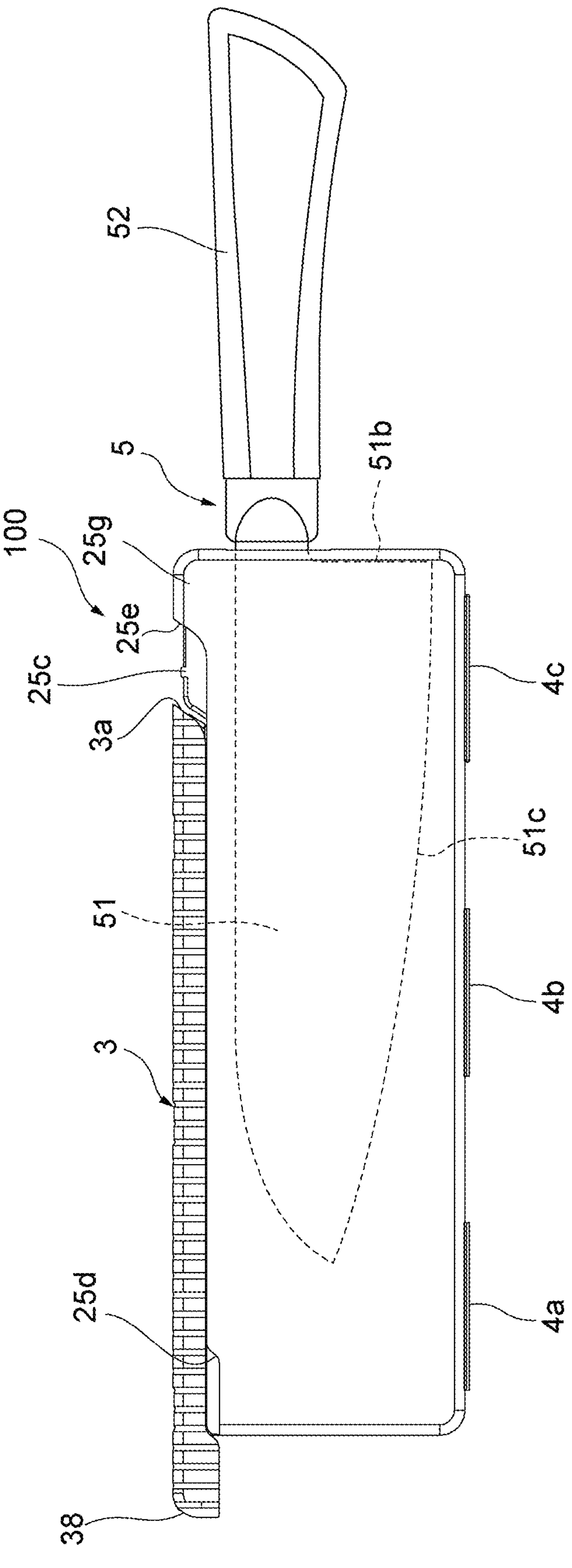
FIG. 12 is a plan view of the knife case in a state where the knife is placed on the knife case and a second case is closed.

Next, the user closes the second case 2 to generate the facing state where the first case 1 and the second case 2 face each other. FIG. 12 is a plan view of the knife case 100 in the facing state where the first case 1 and the second case 2 face each other. As a result, the blade 51 is housed in the housing space formed by the first case 1 and the second case 2 and the handle 52 is exposed from the housing space. The connection part 51*a* is located in a region of the through hole of the housing space formed by the blade passage part 13 of the first case 1 and the blade passage part 23 of the second case 2. In this state, the slide lock member 3 is at the opening position.

Figure 13:
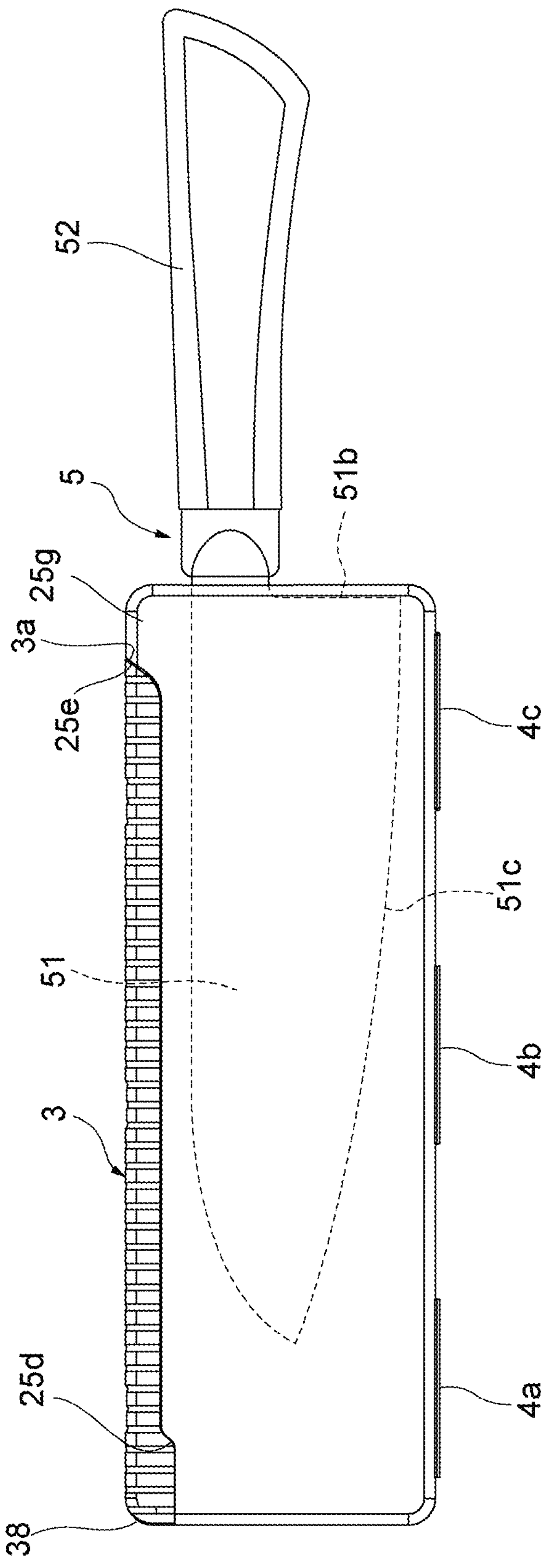
FIG. 13 is a plan view of the knife case in the closed state where the knife is housed in the knife case.

Next, the user moves the slide lock member 3 from the opening position to the closing position to bring the knife case 100 into the closed state. FIG. 13 is a plan view of the knife case 100 in the closed state where the knife 5 is housed in the knife case 100. In this state, the knife case 100 is locked in the closed state by the slide lock member 3 and the knife 5 is stored safely.

The present embodiment has been described by referring to the specific examples. However, the present disclosure is not limited to these specific examples. These specific examples with design changes added appropriately by a person skilled in the art are also covered by the scope of the present disclosure as long as such examples has the characteristics of the present disclosure. Each of the elements belonging to each of the above-described specific examples, arrangement thereof, a condition therefor, a shape thereof, etc. are not limited to those shown as examples but can be changed as appropriate. The elements belonging to the above-described respective specific examples can be combined in different ways, as appropriate, as long as no inconsistency arises.

[Modifications]

The knife case 100 may be configured as follows, for example.

While the slide lock member 3 of the knife case 100 has a configuration with the through hole 35, the slide lock member 3 may be configured to allow a user to visually recognize an open/close identification mark through the through hole 35. In this case, the guide part 15 located behind the through hole 35 is given the open/close identification mark that is represented as a color, a character, a pattern, or a combination thereof. The open/close identification mark is changed in a way in which the mark is visually recognized between the opened state and the closed state of the knife case 100.

In this configuration, when the knife case 100 is viewed even from the end face side, it is still possible to easily determine by visual check whether the knife case 100 is in the opened state or in the closed state. This allows for a configuration with improved safety.

The magnet 12 of the knife case 100 is a plate-like magnet provided in such a manner as to extend over the first surface part 11*a* entirely. However, in a configuration with magnetic force with which the blade 51 of the knife 5 can be held in such a manner as not to come off easily, a different configuration such as that having a plurality of magnets may be employed.

[Characteristics of Knife Case]

As described above, it is possible to lock the knife case 100 of the present embodiment in the closed state at a plurality of positions simultaneously including the both ends of the slide lock member 3 in the longitudinal direction thereof only by making sliding movement of the slide lock member 3 from the opening position to the closing position. Specifically, it is possible to safely maintain a state of housing the knife 5 only by sliding the slide lock member 3. In this closed state, even if the knife case 100 unexpectedly drops, it is still possible to prevent the knife case 100 from being opened easily. This makes a safer configuration than the conventional knife case.

The configuration of the knife case 100 is such that most of the constituting elements are concentrated on the first case 1 side, so that this configuration is easy to assemble during manufacture.

As a result of the configuration where only the blade 51 is housed in the housing space of the knife case 100 and the handle 52 is exposed from the housing space, compactness is achieved in comparison to a configuration where the knife 5 is entirely housed in. This achieves a configuration with excellent portability that can be taken out easily for use outdoors, etc.

In the configuration with the heel support part 14, it is possible to prevent a heel 51*b* of the knife 5 from coming off the case. This prevents a situation where the blade 51 is exposed from the case unless the knife case 100 is opened to achieve a safer configuration.

As the blade passage parts 13 and 23 are provided opposite to the hinges 4*a* to 4*c* side, the blade 51 comes close to the hinges when housed. This makes it unlikely that a cutting edge 51*c* will touch a finger of a user when the knife case 100 is opened, thereby achieving a safer configuration.

In the configuration of the knife case 100, the first slide regulating step part 34 for regulating sliding of the slide lock member 3 from the closing position to the opening position belongs to the slide lock member 3. Furthermore, the first case 1 includes the third slide regulating step part 15*b* for regulating sliding of the slide lock member 3 together with the first slide regulating step part 34. The second case 2 includes the second slide regulating step part 25*c* for regulating sliding of the slide lock member 3 together with the first slide regulating step part 34.

The knife case with this configuration is configured to regulate sliding of the slide lock member 3 from the closing position to the opening position. Thus, it is possible to maintain the closed state easily, thereby achieving a safer configuration. The above-described first slide regulating step part 34, second slide regulating step part 25*c*, and third slide regulating step part 15*b* are shown simply as examples of a slide regulating mechanism for regulating sliding of the slide lock member 3. In one configuration, sliding of the slide lock member 3 may be regulated by a different structure.

The knife case 100 is configured in such a manner that the cutting edge 51*c* of the knife 5 to be housed therein is pointed toward the hinges 4*a* to 4*c*. This might cause contact of the cutting edge 51*c* with the hinges 4*a* to 4*c* during housing or taking out of the knife 5. In this case, the hinges 4*a* to 4*c* might be damaged partially. In this regard, in the knife case 100 of the present embodiment, the hinges 4*a* to 4*c* are three hinges separated from each other in the longitudinal direction. Thus, if one of the hinges is damaged, the other two hinges are left in effect, thereby preventing a situation where the hinges are damaged immediately in their entirety. In this way, it is possible to configure a knife case having durability and safety. The number of hinges is not limited to three. The above purpose becomes attainable by providing hinges of a number equal to or greater than three.

As the knife case 100 of the present embodiment has excellent portability, it is also suitable for use outdoors. In using a knife outdoors, conditions are not prepared well in many cases compared to an indoor kitchen and it may be necessary to conduct various types of work with a wet hand. In order to be suitable even for such a situation, the configuration of the knife case 100 is provided with the surface asperities 33 acting as a slip resistance on the surface of the slide lock member 3. Thus, even if the knife case 100 is used outdoors, a configuration taking safety into consideration is still achieved. As a result of being capable of easily preventing sliding down, the knife case 100 is certainly given a safer configuration also in the case of use in an indoor kitchen.

REFERENCE SIGNS LIST

100 . . . . Knife case, 1 . . . . First case, 11*a* . . . . First surface part, 11*b* . . . . First wall part, 12 . . . . Magnet, 13 . . . . Blade passage part, 14 . . . . Heel support part, 15 . . . . Guide part, 15*a* . . . . Cutout, 15*b* . . . . Third slide regulating step part, 161 . . . . Guide groove, 161*a*, 161*b* . . . . Movement regulating part, 17 . . . . Fitting groove, 18 . . . . Fitting projection part, 2 . . . . Second case, 21*a* . . . . Second surface part, 21*b* . . . . Second wall part, 23 . . . . Blade passage part, 24 . . . . Ridge, 25*a*, 25*b* . . . . Locked part, 25*c* . . . . Second slide regulating step part, 25*d*, 25*e*, 25*f* . . . . Movement regulating part, 27 . . . . Fitting ridge, 28 . . . . Recess part, 3 . . . . Slide lock member, 31 . . . . Bottom part, 32 . . . . Wall part, 33 . . . . Surface asperities, 34 . . . . First slide regulating step part, 35 . . . . Through hole, 36 . . . . Guide projection, 37 . . . . Movement regulating part, 4*a* to 4*c* . . . . Hinges, 5 . . . . Knife, 51 . . . . Blade, 51*a* . . . . Connection part, 51*b* . . . . Heel, 51*c* . . . . Cutting edge, 52 . . . . Handle

What is claimed is:

1. A knife case comprising a first case and a second case, the knife case configured to make a knife with a blade and a handle lockable in a closed state using a slide lock member while housing the blade in a housing space formed in the closed state and exposing the handle from the housing space, the closed state being a state where the first case and the second case face each other and that are coupled to each other via a hinge, wherein the first case includes:

a first surface part;

a first wall part formed in such a manner as to project from an edge of the first surface part in a direction perpendicular to the first surface part;

a magnet provided at the first surface part to face the second case in the closed state;

a blade passage part formed in a short-side direction of the first case opposite to the hinge, and configured to allow a connection of the blade with the handle to pass therethrough in the closed state;

a heel support part provided closer to the hinge than the blade passage part and formed of a ridge projecting from an edge of the first surface part or from the vicinity of the edge in a direction perpendicular to the first surface part so as to prevent a heel of the knife from coming off the housing space in the closed state;

a guide part provided at an edge portion opposite to the hinge in such a manner as to extend in a longitudinal direction of the first case, and guiding movement of the slide lock member; and the slide lock member attached to the guide part and configured to be slidable along the guide part between a closing position defined in the closed state and an opening position defined in an opened state, the second case includes:

a second surface part to face the first surface part in the closed state;

locked parts provided at an edge portion opposite to the hinge and are located at a plurality of positions including both ends of the slide lock member in a longitudinal direction thereof in the closed state; and a ridge provided at a position to face the heel support part in the closed state and projecting from the second surface part in a perpendicular direction, and by moving the slide lock member from the opening position to the closing position, the guide part and the locked parts are covered with the slide lock member to lock the knife case at the plurality of positions including the both ends of the slide lock member in the longitudinal direction thereof simultaneously so as to prevent release of the second case from the first case.

2. The knife case according to claim 1, wherein the slide lock member includes a slide regulating step part that regulates sliding of the slide lock member from the closing position to the opening position.

3. The knife case according to claim 1, wherein the hinge is formed by being separated into three or more in the longitudinal direction of the first case and a longitudinal direction of the second case.

4. The knife case according to claim 1, wherein the slide lock member has a surface provided with asperities.

5. The knife case according to claim 1, wherein the slide lock member is formed into a U-shape in a section in such a manner as to cover an end face of the first case opposite to the hinge, and has a through hole formed in such a manner as to face the end face of the first case, and the first case has an open/close identification mark that is changed in a way in which the mark is visually recognized through the through hole between the opened state and the closed state.

* * * * *